(12) United States Patent
Liu et al.

(10) Patent No.: US 11,777,592 B2
(45) Date of Patent: Oct. 3, 2023

(54) INTELLIGENT MEASUREMENT AND CONTROL COMMUNICATION NETWORK SYSTEM

(71) Applicant: The 10th Research Institute of China Electronics Technology Group Corporation, Sichuan (CN)

(72) Inventors: Tian Liu, Sichuan (CN); Ting Li, Sichuan (CN); Tian Yuan, Sichuan (CN); Jie Sun, Sichuan (CN); Hui Tang, Sichuan (CN)

(73) Assignee: The 10th Research Institute of China Electronics Technology Group Corporation, Sichuan (CN)

( * ) Notice: Subject to any disclaimer, the term of this patent is extended or adjusted under 35 U.S.C. 154(b) by 497 days.

(21) Appl. No.: 17/440,200

(22) PCT Filed: May 21, 2018

(86) PCT No.: PCT/CN2018/087618
§ 371 (c)(1),
(2) Date: Sep. 17, 2021

(87) PCT Pub. No.: WO2019/184067
PCT Pub. Date: Oct. 3, 2019

(65) Prior Publication Data
US 2022/0166495 A1  May 26, 2022

(30) Foreign Application Priority Data

Mar. 26, 2018 (CN) .......................... 201810253821.4

(51) Int. Cl.
*H04K 1/10* (2006.01)
*H04L 27/28* (2006.01)
(Continued)

(52) U.S. Cl.
CPC ..... *H04B 7/18506* (2013.01); *H04B 7/18519* (2013.01); *H04B 7/195* (2013.01); *H04L 41/12* (2013.01)

(58) Field of Classification Search
CPC ....................... H04B 7/18506; H04B 7/18519; H04B 7/195; H04B 10/25755; H04B 7/18521; H04W 40/14; H04W 40/02; H04L 67/63
(Continued)

(56) References Cited

U.S. PATENT DOCUMENTS 6,078,810 A * 6/2000 Olds ...................... H04B 7/195
455/430
6,985,454 B1 * 1/2006 Wiedeman ......... H04B 7/18589
370/316
(Continued)

FOREIGN PATENT DOCUMENTS

| CN | 101552933 A | 10/2000 |
|---|---|---|
| CN | 102201854 A | 9/2011 |

(Continued)

*Primary Examiner* — Phuong Phu
(74) *Attorney, Agent, or Firm* — Yu Gang

(57) ABSTRACT

The intelligent measurement and control communication network at least includes at least one management node and at least one common node. The whole intelligent measurement and control communication network is logically divided into a control plane and a service plane. The control plane selects a routing strategy with the shortest path to cause each management node on the control plane to communicate with all common nodes. The service plane is divided into multiple task subnets according to tasks performed by each node, and each task subnet may select different routing strategies according to task requirements of this task subnet. According to the application and scenario needs of the tasks, the control plane combines externally changed parameters and utilizes machine learning to gener- (Continued)

ate a new mathematical model in real time and sends a new task instruction to the service plane.

10 Claims, 2 Drawing Sheets

(51) Int. Cl.
    *H04B 7/185*     (2006.01)
    *H04B 7/195*     (2006.01)
    *H04L 41/12*     (2022.01)

(58) Field of Classification Search
    USPC .................................... 375/260, 219, 220
    See application file for complete search history.

(56) References Cited

U.S. PATENT DOCUMENTS

| | | | |
|---|---|---|---|
| 7,366,125 B1* | 4/2008 | Elliott | H04B 7/18521 455/12.1 |
| 7,599,314 B2 | 10/2009 | Wittenschlaeger | |
| 9,763,167 B2* | 9/2017 | Gopal | H04W 40/02 |
| 10,069,935 B1* | 9/2018 | Coleman | H04L 67/63 |
| 11,133,869 B1* | 9/2021 | Scott | H04B 10/25755 |
| 2008/0218411 A1 | 9/2008 | Wigren et al. | |
| 2016/0080072 A1* | 3/2016 | Baudoin | H04W 40/14 370/219 |

FOREIGN PATENT DOCUMENTS

| | | |
|---|---|---|
| CN | 102413535 A | 4/2012 |
| CN | 103178895 A | 6/2013 |
| CN | 103780475 A | 5/2014 |
| CN | 103781079 A | 5/2014 |
| CN | 104601363 A | 5/2015 |
| CN | 106160836 A | 11/2016 |
| CN | 106603147 A | 4/2017 |
| CN | 107343025 A | 11/2017 |
| CN | 107579845 A | 1/2018 |
| CN | 107798388 A | 3/2018 |

\* cited by examiner

INTELLIGENT MEASUREMENT AND CONTROL COMMUNICATION NETWORK SYSTEM

TECHNICAL FIELD

The present disclosure relates to a measurement and control communication network, and in particular to an intelligent measurement and control communication network which can meet the rapid increase of the number of future space vehicles and greatly increase the requirements for measurement and control and satellite applications.

BACKGROUND

A measurement and control communication network is a product of the combination of a modern aerospace technology, measurement and control, communication and a network technology. The measurement and control communication network makes full use of the characteristics of large satellite coverage and flexible and efficient transmission of a networking satellite group, and realizes efficient and seamless communication facing the world through networking and interconnection between different satellite nodes, between a satellite node and ground, and between a satellite node and an air node. The intelligent measurement and control communication network is an intelligent body composed of various types of satellite systems in different orbits, where inter-satellite communication links are intercommunicated and intercommunicated according to the maximum and effective comprehensive utilization of spatial information resources. The network may integrate various aerospace systems, including reconnaissance and monitoring, environment and disaster monitoring, resource detection, early warning, navigation and positioning, etc., and has the capability of autonomous operation and management and intelligent information acquisition, storage, processing and distribution. The intelligent measurement and control communication network is mainly composed of system groups such as information acquisition, information transmission and information processing, navigation and positioning, network management and security defense. The information acquisition system is mainly responsible for collecting information. The information transmission system is mainly responsible for information transmission and relay, including a communication satellite, a broadcasting satellite, a data relay satellite and a ground receiving system. The information processing system mainly completes the tasks such as preprocessing, secondary processing, information fusion and comprehensive analysis of satellite acquired data, including high-performance information processors and corresponding software and databases carried by each satellite, a special data processing satellite and a ground processing and application system. The navigation and positioning system is composed of multiple navigation satellites in different orbits and a ground monitoring system, which provides navigation, speed measurement and time service for various mobile or stationary carriers including satellites from the ground to space. The network management system is composed of a ground management center and a space-based management center constituted by a computer system with a data relay or information processing satellite, which may independently or jointly complete the management and control functions of network constellation operation monitoring, command and control, and information exchange. The security defense system is responsible for the security of a space-based network. Since the space network environment is different from the ground, the data network has long transmission delay, weak signal level and high channel noise, which may include at least one unreliable space data transmission link, resulting in frequent interruption of the Doppler frequency ground communication. With the increase of the number of targets, the consumption of spacecraft measurement and control resources increases rapidly, and the space environment is becoming increasingly complex. An existing ground-based measurement and control communication network cannot meet the requirements for the operation management, monitoring, measurement and control and information transmission of satellite multi-satellite networking, which brings great network management problems, and the existing operation management mode is basically unavailable. Due to the small number of existing macro-satellites in low and medium orbits, they are basically in a single-satellite working mode, and the period of revisiting an observed target is long, so the ground-based measurement and control communication network is unbearable about the operation management and monitoring measurement and control work of various satellite constellation networking. At present, it will be a big problem to rely on domestic satellite ground-based measurement and control stations to support the information transmission of a future satellite constellation system. The main difficulty is that the domestic ground-based measurement and control stations can only support the data reception when the satellite passes over the top, but cannot give full play to the advantages of global real-time observation information acquisition of satellite constellation. Secondly, the limitation of the number of domestic satellites on the ground will cause time conflicts in satellite-to-ground communication tasks. At present, it is difficult to adopt the ground-based measurement and control communication system, which is due to the limitation of a ground-based task assistant support system and constraints of a ground communication network, which makes flight control support program extremely complicated and difficult. In the future, the intelligent measurement and control communication network will provide more and more services, and different services will have different requirements for networking technology. In addition, with the increase of the number of satellites, the intelligent measurement and control communication network will gradually become huge and complex. Relying on a manual management and operation mode, the occupancy rate of measurement and control resources is too high, the task response is not timely, the burden of operators is heavy, and the error probability is high. The intelligent measurement and control communication network technology facilitates reducing the use of the measurement and control resources, the burden of the operators and the risk of errors.

The application of an intelligent cognitive technology in measurement and control communication network is represented by National Aeronautics and Space Administration (NASA)'s SCaN test bed. The test bed was developed around 2008 and has been carried on the International Space Station. At present, research focus of NASA is the Cognitive Communication Project. NASA is using the developed intelligent routing software Cogent to verify the concept of on-orbit application of cognitive networking on the SCaN space test bed. Cogent supports adaptive routing and multi-link operation, and may handle two protocols of Delay Tolerant Networks (DTN) and Internet Protocol (IP). At present, it is impossible to control a radio system running on the test bed (fixed running or adaptive waveforms).

Cognent creates a virtual interface at an interlayer boundary, representing different sets of bottom-level options, so that the running of the Cognent may not affect the data flow directly reaching an actual bottom-level interface. For example, between the IP and a link layer, an IP routing table is utilized to select an appropriate outgoing interface. A specific test subnet business may be sent to a Cognent virtual interface, while other businesses continue to select routes normally. The method runs cognitive networking in an incremental deployment mode, and has an option of "fault insurance", bypassing cognitive decision making. The current version of Cogent software can perceive and adapt to link characteristics, but cannot check decision and implementation learning algorithm of this Cogent software.

The main units of Cogent design include a cognitive engine, an application programming interface on the cognitive engine, a scheduling algorithm and a content cache. The primary focus of implementation of this work is to realize DTN data flow, adapt to the change of data rate of an underlying link, and make DTN have the ability to use multiple link sets. In addition, for applications with different service quality requirements, the current version of Cogent can optimize radio link selection to achieve the lowest delay and the highest bandwidth. For example, for low delay, the Cognent can select a direct earth link instead of a relay interface of space network, and for high throughput, a Ka band instead of a S band is selected.

The main purpose of NASA's construction of a Cogent prototype system is to provide a tool to identify the research needed in the future by implementing an early cognitive agent on the SCaN test bed. In addition, the NASA also uses the Cogent to collect data in daily running. The NASA hopes to use this information to support gateway-level "small brain" running and network-level "large brain" running in the future, but the implementation of the corresponding learning algorithm is still in its infancy.

In the future, the development trend of the intelligent measurement and control communication network system is mainly reflected in the following aspects.

(1) The formation topological configuration is diverse, flexible and reconfigurable.
(2) The improvement of inter-satellite link frequency band and limited field-of-view networking are research hotspots.
(3) High-precision relative measurement and time comparison are the research focus.
(4) Autonomous cluster control and space/ground joint management are important directions of technology development.

SUMMARY

At least some embodiments of the present disclosure provide an intelligent measurement and control communication network system which can improve the network running efficiency and the network autonomous running capability and meet diversified service requirements, so as at least to partially solve the problems of rapid increase of the consumption of spacecraft measurement and control resources along with the increase of the number of spacecrafts and the increasingly complex space environment.

In an embodiment of the present disclosure, an intelligent measurement and control communication network system is provided, which includes that: an intelligent measurement and control communication network at least includes at least one management node and at least one common node. In order to facilitate the management and efficient operation of the network, the whole intelligent measurement and control communication network is logically divided into a control plane and a service plane. All spacecrafts are divided into the at least one management node, the at least one common node and at least one gateway node. A ground-based measurement and control station or at least one specific satellite is set as the at least one management node. The at least one common node forms one of the service planes. The service plane is divided into multiple task subnets according to the tasks executed by the nodes. Each task subnet completes tasks of this task subnet respectively, and quickly responds to multiple tasks at the same time, performs autonomous network construction, autonomous cross-layer network resource management and intelligent routing with resource cognition, so as to meet the scalability of the network. The control plane and the service plane adopt different networking modes to perform their duties, respectively, and respond to multiple different applications simultaneously through different subnets of the service plane. According to the application and scenario needs of the tasks, the control plane combines externally changed parameters to generate a new mathematical model in real time, adaptively changes a network behavior or algorithm, logic and encoding parameters, selects a routing strategy with the shortest path, and selects a new management node from the service plane through machine learning. The at least one management node is communicated with all common nodes, measures and controls a formation spacecraft cluster target and an information interaction target through a satellite-to-ground link, and quickly distributes control information including a ground instruction. The ground-based measurement and control station is communicated with the at least one management node through the satellite-to-ground link, and indirectly achieves measurement and control communication with the at least one common nodes through the at least one management node.

Compared with the related art, the present disclosure has the following beneficial effects.

1. The network running efficiency is improved. The present disclosure logically divides the whole intelligent measurement and control communication network into the control plane and the service plane, and the two planes are responsible for different functions and networking modes. The control plane completes the topological information maintenance of the whole network, the routing maintenance of the whole network, the distribution of the control information (including the ground instruction) and network management. According to the application and scenario needs of the tasks, the control plane combines machine learning and selects the routing strategy with the shortest path to ensure the rapid distribution of the control information. The service plane composed of the at least one common node is divided into multiple task subnets according to the tasks executed by the nodes, and the nodes in each task subnet cooperate with each other to complete a certain task. Each subnet completes tasks of this subnet without interference, which realizes simultaneous and rapid response to multiple tasks, implements autonomous network construction, executes autonomous cross-layer network resource management and intelligent routing with resource cognition, meets the scalability of the network, greatly reduces the protocol overhead such as routing maintenance information in the subnets, and improves the network running efficiency, and can adapt to the increasingly complex space network environment.

2. The present disclosure logically divides the whole intelligent measurement and control communication network into the control plane and the service plane, and the two planes respectively adopt different networking modes to perform their respective duties. Different subnets of the service plane simultaneously respond to a plurality of different applications, so that the target of simultaneous measurement and control and information interaction of cluster targets such as formation spacecrafts are realized, and the problems caused by centralization of traditional measurement and control centers are solved. On this basis, based on the cognitive network technology, the machine learning method is adopted to solve the challenges brought by the dynamic space environment, random interference and diverse tasks, so that the system has the ability of autonomy, self-adaptation and scalability.

3. Multiple service types with different networking requirements are supported. The present disclosure aims at the increasing diversity of services provided by the intelligent measurement and control communication network in the future, and different requirements of different services for the networking technology and divides the service plane into a plurality of task subnets according to the tasks executed by the service plane. The nodes in each task subnet intelligently optimize the network configuration according to the service requirements and cooperate with each other to complete a certain task. Each subnet completes tasks of this subnet without interference, realizing simultaneous and rapid response to multiple tasks, and providing efficient and reliable networking support for various services.

4. The system adaptability and usability are improved. Through mathematical modeling and deep learning, the intelligent measurement and control communication network system has autonomous learning ability. When the environment changes and a new service type appears, or when the system goes wrong, in combination with the externally changed parameter, the intelligent measurement and control communication network system may intelligently learn and generate a new mathematical model in real time when the external environment changes or the system goes wrong, and adaptively change the network behavior or parameters (such as algorithm, logic, encoding, etc.), thus improving the adaptability and usability of the system.

The present disclosure may be widely applied to cluster combat tasks such as wide-area Synthetic aperture radar (SAR), long baseline interferometer precise positioning to the ground, high-resolution reconnaissance and monitoring, space-based early warning detection, unmanned aerial vehicle cooperative reconnaissance, cluster attack and the like, adapts to the increasingly complex environment of the intelligent measurement and control communication network in the future, and improves the network running efficiency and autonomous control capability.

BRIEF DESCRIPTION OF THE DRAWINGS

The present disclosure is further described below in combination with the accompanying drawings and embodiments.

DETAILED DESCRIPTION

Figure 1:
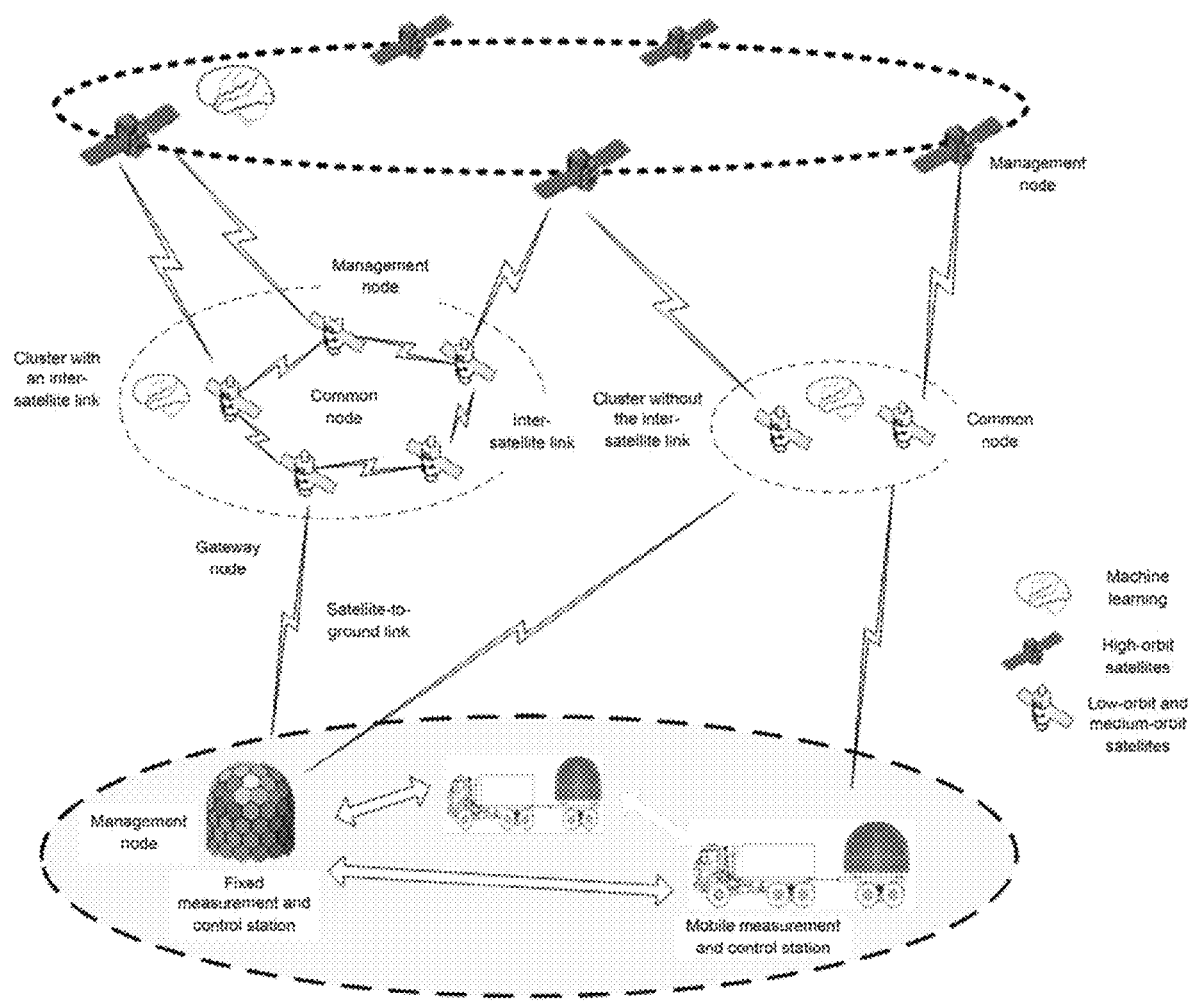
FIG. 1 is a schematic diagram of an intelligent measurement and control communication network system according to an embodiment of the present disclosure.

As shown in FIG. 1, in an intelligent measurement and control communication network system, an intelligent measurement and control communication network at least includes: at least one management node and at least one common node. In order to facilitate the management and efficient operation of the network, the whole intelligent measurement and control communication network is logically divided into a control plane and a service plane, and all spacecrafts are divided into the at least one management node, the at least one common node and at least one gateway node. A ground-based measurement and control station or at least one specific satellite is set as the at least one management node, and the at least one common node forms the service plane. The service plane is divided into multiple task subnets according to tasks executed by the nodes. Each task subnet completes tasks of this task subnet respectively, responds to multiple tasks quickly, and performs autonomous network construction, autonomous cross-layer network resource management and intelligent routing with resource recognition, so as to meet the scalability of the network. The control plane and the service plane respectively adopt different networking modes to perform their duties. Different subnets of the service plane simultaneously respond to different applications. According to the application and scenario needs of the tasks, the control plane combines externally changed parameters to generate a new mathematical model in real time, adaptively changes a network behavior or algorithm, logic and encoding parameters, selects a routing strategy with the shortest path, and selects a new management node from the service plane through machine learning. The selected management node is communicated with all common nodes, measures and controls a formation spacecraft cluster target and an information interaction target through a satellite-to-ground link, and quickly distributes control information including a ground instruction. The ground-based measurement and control station is communicated with the selected management node through the satellite-to-ground link, and indirectly implements the measurement and control communication on the at least one common node through the selected management node.

The ground-based measurement and control station divides low-orbit and medium-orbit satellites into a cluster with an inter-satellite link and a cluster without the inter-satellite link. The cluster with the inter-satellite link and the cluster without the inter-satellite link complete measurement and control, communication and relative measurement tasks through a satellite-to-ground measurement and control data transmission link or a relay measurement and control link. The control plane contains the at least one management node and the at least one common node. The at least one management node may be the ground-based measurement and control station, or a certain specific spacecraft, or multiple specific spacecrafts. The at least one common node is at least one general spacecraft performing tasks. Since not all nodes can be directly communicated with the ground-based measurement and control station, at least one spacecraft directly communicated with the ground-based measurement and control station is called the at least one gateway node. The at least one gateway node may be served by different spacecrafts at different times with the movement of the spacecrafts. Therefore, a management node with strong processing ability is responsible for the management work of routing and task distribution of the whole intelligent measurement and control communication network. A spacecraft executing the tasks is a common node. A spacecraft directly communicated with the ground-based measurement and control station is a gateway node. The information transmission between the ground-based measurement and control station and each management node or each common node is transferred by the at least one gateway node.

The at least one management node receives first information from at least one of the at least one common node and the ground-based measurement and control station, calculates second information based on the first information, and sends the second information to each common node. After receiving the second information, the at least one common node starts to execute the task, sends third information to the at least one management node after the task is completed or when an error occurs, or continues to execute the current task without receiving fourth information from the at least one management node. When the external environment of the intelligent measurement and control communication network system changes and the system goes wrong, the above calculation process will intelligently learn and generate the new mathematical model in real time, and adaptively change the network behavior or the algorithm, logic and encoding parameters. The at least one management node and common nodes which do not execute the tasks or have executed the tasks are logically located on the control plane. Common nodes which execute the tasks are logically located on the service plane. The common nodes located on the control plane or the common nodes located on the service plane have at least one of the following differences: different identifiers, different routing protocols and different topological relations with other common nodes.

The above tasks include but are not limited to at least one of the following: navigation, remote sensing, reconnaissance, communication, etc. The at least one management node may be one of the ground-based measurement and control station, and at least one specific satellite.

The first information includes multiple sub-items. The multiple sub-items include at least one of the following: task information, location information, topological information (i.e., the connection relations among all nodes), and a running state of each device of the at least one common node. The task information includes one of the following: task information of the at least one common node, task information of at least one local node and task information of all nodes. The location information includes one of the following: location information of the at least one common node, location information of a local network and location information of the whole network. The topological information includes one of the following: topological information of the at least one common node, topological information of a local network and topological information of the whole network.

The task information in the first information may not be specific to some common nodes, but includes tasks to be completed by the whole intelligent measurement and control communication network. The at least one management node calculates the second information for each common node.

Each sub-item in the first information may come from different places. For example, the task information comes from the ground-based measurement and control station, and the location information, the topological information and the device running state come from the at least one common node.

The second information includes multiple sub-items. The multiple sub-items include at least one of the following: the task executed by the current common node, the routing protocol used by the current common node, the identifier of the current common node on the service plane, and the identifiers of other common nodes on the service plane.

The third information includes multiple sub-items. The multiple sub-items include at least one of the following: whether the task is completed or not, and the reason why the task is not completed.

The fourth information includes at least one of the following: a new task and a task ending instruction.

When the at least one management node calculates the second information, a machine learning method may be employed. The machine learning method includes but is not limited to: linear regression, a decision tree, a support vector machine, a Bayesian classifier, etc. The function of machine learning is that when the at least one management node performs the above calculation, machine learning may be utilized to speed up the calculation or get a better result through calculation.

Figure 2:
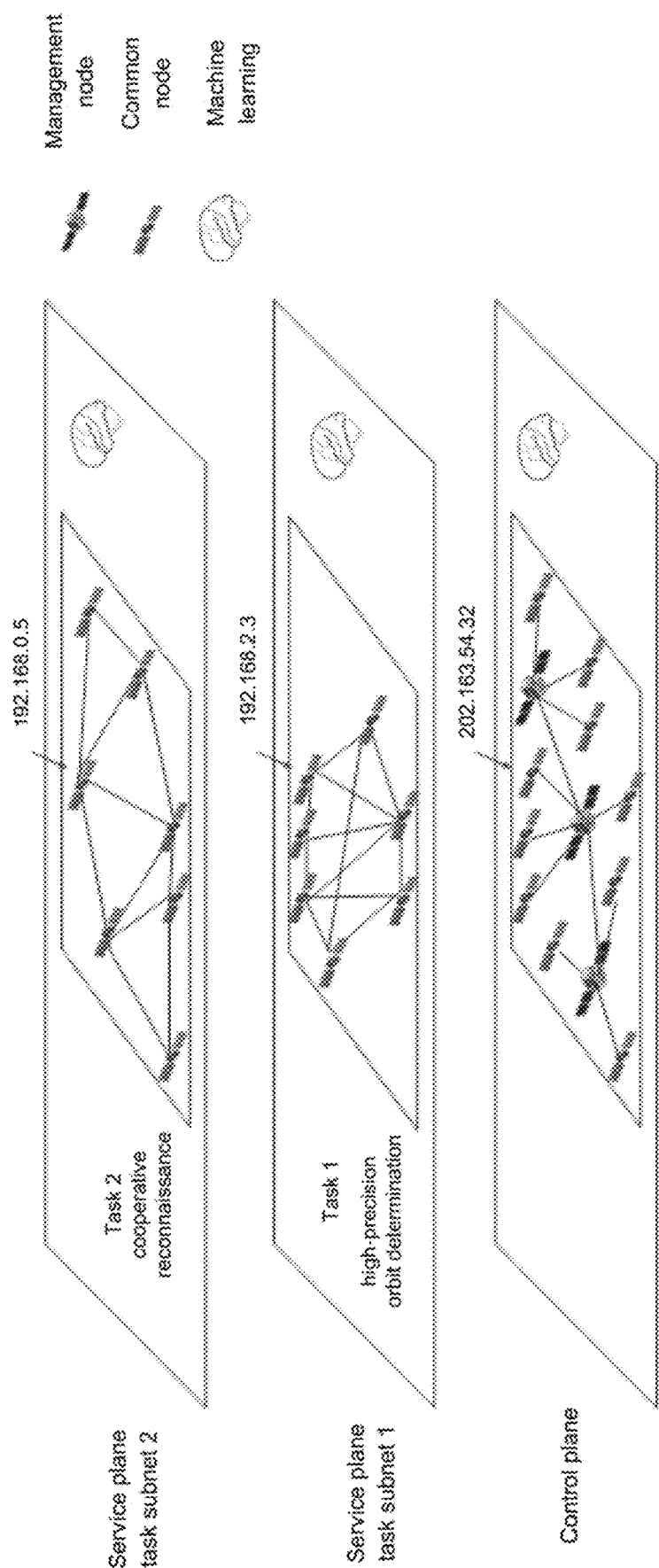
FIG. 2 is a schematic diagram of a division mode of a control plane and a service plane according to an embodiment of the present disclosure.

FIG. 2 shows an embodiment of dividing a control plane and a service plane. Each management node is communicated with common nodes distributed on the same control plane. Each management node manages the common nodes distributed on the control plane network to execute tasks, and the common nodes executing the same task or related tasks are assigned into the same task subnet. In order to facilitate the management and efficient operation of the network, the whole intelligent measurement and control communication network is logically divided into the control plane and the service plane. All these nodes on the control plane and the service plane are inter-communicated through wireless links to form a mesh, which constitutes the intelligent measurement and control communication network system. The service plane is divided into a service plane task subnet 1 for executing a high-precision orbit determination task 1 and a service plane task subnet 2 for a cooperative reconnaissance task 2. The common nodes on the same task subnet have service plane identifiers of the same attribute (such as IP addresses of the same network segment), the same service plane routing protocol, and the like. Common nodes on different task subnets may have service plane identifiers of different attributes (such as IP addresses of the same network segment), different service plane routing protocols, and the like.

The biggest difference between the service plane and the control plane is that the tasks executed by the at least one common node may be divided into the service plane, and the tasks not executed or completed by the at least one common node may be divided into the control plane. Secondly, after entering the service plane, the common nodes may have routing protocols, or IP address identifiers, or topological relations of the connection relationships among the nodes, etc., different from those of the control plane. Related information is transmitted to a corresponding management node by each common node when each task executed by this common node changes, topological relations with other common nodes changes, and each device of this common node does not run correctly. According to the received information, the corresponding management node calculates and updates the routing, the tasks to be executed, and the like of each common node in real time. Moreover, the at least one management node calculates the routing of all nodes in the whole network or manages the tasks to be executed by each node according to the collected information of the at least one common nodes, and sends the tasks to be executed by the node, the identifiers on the service plane, the topological relations and the routing protocols to the corresponding common nodes according to calculation results. The sender of this information related to the same common node may not be one. For example, the task information may come from the ground-based measurement and control station, and the topological relations between the node and other common nodes, and whether each device of the node is running normally or not may come from this common node.

As shown in FIG. 1 and FIG. 2, the following embodiments are provided.

Embodiment One

A management node is the ground-based measurement and control station, and common nodes are multiple satellites. The orbit information of all satellites, the topological information of the whole measurement and control communication network including the ground-based measurement and control station and all the satellites, the task information to be executed by each satellite, etc. (i.e., the first information) have been stored in the ground-based measurement and control station. After calculation, when each satellite passes over the top, the ground-based measurement and control station sends information to each satellite, and the information includes the tasks to be executed by this satellite and which satellites this satellite need to connect with to form a specific topology (i.e., the second information). According to the received task information, all the satellites continue to execute the task until these satellites receive new task information (i.e., the fourth information) from the ground-based measurement and control station when passing over the top.

Embodiment Two

A management node is the ground-based measurement and control station, and common nodes are multiple satellites. The orbit information of all satellites, the topological information of the whole measurement and control communication network including the ground-based measurement and control station and all the satellites, the task information to be executed by each satellite, etc., (i.e., the first information) have been stored in the ground-based measurement and control station. After calculation, when each satellite passes over the top, the ground-based measurement and control station sends information to each satellite, and the information includes the tasks to be executed by this satellite and which satellites this satellite need to connect with to form a specific topology (i.e., the second information). All the satellites execute the task according to the received task information, and send task completion information or task error information (i.e., the third information) to the ground-based measurement and control station when passing over the top after the task is completed or the task goes wrong.

Embodiment Three

A management node is the ground-based measurement and control station, and common nodes are multiple satellites. The orbit information of all satellites, the topological information of the whole measurement and control communication network including the ground-based measurement and control station and all the satellites, the task information to be executed by each satellite, etc. (i.e., the first information) have been stored in the ground-based measurement and control station. After calculation, when a certain satellite passes over the top, the ground-based measurement and control station transfers information such as the tasks all the satellites shall execute and which satellites it shall connect with to form a specific topology (i.e., the second information) to other satellites through the satellite. According to the received task information, all the satellites continue to execute the task until these satellites receive new task information (i.e., the fourth information) from the ground-based measurement and control station. The transmission of the fourth information is also transferred to all the satellites through a certain overhead satellite. The satellite which plays the role of transfer each time may not be the same satellite.

Embodiment Four

A management node is the ground-based measurement and control station, and common nodes are multiple satellites. The orbit information of all satellites, the topological information of the whole measurement and control communication network including the ground-based measurement and control station and all the satellites, the task information to be executed by each satellite, etc. (i.e., the first information) have been stored in the ground-based measurement and control station. After calculation, when a certain satellite passes over the top, the ground-based measurement and control station transfers information such as the tasks to be executed by all the satellites and which satellites these satellite need to connect with to form a specific topology (i.e., the second information) to other satellites through this certain satellite. All the satellites execute the task according to the received task information, and send task completion information or task error information (i.e., the third information) to the ground-based measurement and control station after the task is completed or the task goes wrong. The third information is transferred to the ground-based measurement and control station through a certain overhead satellite. The satellite which plays the role of transfer each time may not be the same satellite.

Embodiment Five

At least one management node is at least one specific satellite, such as at least one relay satellite, and common nodes are multiple other satellites. The orbit information of all satellites, the topological information of the whole measurement and control communication network including all the satellites, the task information to be executed by all other satellites, etc., (i.e., the first information) have been stored in the at least one specific satellite. After calculation, when other satellites are located in beam ranges of these satellites, the at least one specific satellite sends information to other satellites, and the information includes the tasks to be executed by these satellites and which satellites these satellite need to connect with to form a specific topology (i.e., the second information). According to the received task information, all the satellites continue to execute the task until these satellites receive new task information (i.e., the fourth information) from the at least one specific satellite.

Embodiment Six

At least one management node is at least one specific satellite, such as at least one relay satellite, and common nodes are multiple other satellites. The orbit information of all satellites, the topological information of the whole measurement and control communication network including all the satellites, the task information to be executed by all other satellites, etc., (i.e., the first information) have been stored in the at least one specific satellite. After calculation, when other satellites pass through beam ranges of these satellites, the at least one specific satellite sends information to other satellites, and the information includes the tasks to be executed by these satellites and which satellites these satellite need to connect with to form a specific topology (i.e., the second information). After other satellites complete the task or the task goes wrong, task completion information or task error information (i.e., the third information) is sent to at least one specific satellite.

Embodiment Seven

At least one management node is at least one specific satellite, such as at least one relay satellite, and common nodes are multiple other satellites. The orbit information of all other satellites, the topological information of the whole measurement and control communication network including all the satellites, the task information to be executed by all other satellites, etc., (i.e., the first information) have been stored in the above specific satellite. After calculation, when a certain satellite passes through a beam range of this satellite, the at least one specific satellite transfers information including the tasks to be executed by these satellites and which satellites these satellite need to connect with to form a specific topology (i.e., the second information) to all other satellites through this certain satellite. According to the received task information, all other satellites continue to execute the task until these satellites receive new task information (i.e., the fourth information) from the at least one specific satellite. The fourth information is also transferred to all the satellites through a certain other satellite located in the specific satellite beam range. Another satellite which plays the role of transfer each time may not be the same satellite.

Embodiment Eight

At least one management node is at least one specific satellite, such as at least one relay satellite, and common nodes are multiple other satellites. The orbit information of all other satellites, the topological information of the whole measurement and control communication network including all the satellites, the task information to be executed by all other satellites, etc., (i.e., the first information) have been stored in the at least one specific satellite. After calculation, when a certain satellite passes through a beam range of this satellite, the at least one specific satellite transfers information including the tasks to be executed by these satellites and which satellites these satellite need to connect with to form a specific topology (i.e., the second information) to all other satellites through this certain satellite. All other satellites execute the task according to the received task information, and send task completion information or task error information (i.e., the third information) to the at least one specific satellite after the task is completed or the task goes wrong. The third information is also transferred through a certain other satellite located in the specific satellite beam range. Another satellite that plays the role of transfer each time may not be the same satellite.

Embodiments Nine-Twelve

At least one management node is at least one specific satellite, such as at least one relay satellite, and common nodes are multiple other satellites. The orbit information of other satellites, the topological information of the whole measurement and control communication network including all the satellites, and the like (i.e., part of sub-item 1 of the first information) are sent by other satellites to a specific satellite through the inter-satellite link. The task information to be executed (i.e., part of sub-item 2 of the first information) by all other satellites is sent to the specific satellite by the ground-based measurement and control station when the specific satellite passes over the top, or transferred to the specific satellite by a certain other satellite when this satellite passes over the top. After calculation, when other satellites pass through beam ranges of these satellites, the at least one specific satellite sends information to other satellites, and the information includes the tasks to be executed by these satellites and which satellites these satellite need to connect with to form a specific topology (i.e., the second information). According to the received task information, all the satellites continue to execute the task until these satellites receive new task information (i.e., the fourth information) from the at least one specific satellite.

Embodiments Thirteen-Sixteen

At least one management node is at least one specific satellite, such as at least one relay satellite, and common nodes are multiple other satellites. The orbit information of other satellites, the topological information of the whole measurement and control communication network including all the satellites, the task information to be executed by all other satellites, etc. (i.e., the first information) are sent to a specific satellite by the ground-based measurement and control station when the specific satellite passes over the top, or transferred to the specific satellite through a certain other satellite when this satellite passes over the top. After calculation, when other satellites pass through beam ranges of these satellites, the at least one specific satellite sends information to other satellites, and the information includes the tasks to be executed by these satellites and which satellites these satellite need to connect with to form a specific topology (i.e., the second information). According to the received task information, all the satellites continue to execute the task until these satellites receive new task information (i.e., the fourth information) from the at least one specific satellite.

The above is the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subjected to the scope of protection of the claims.

What is claimed is:

1. An intelligent measurement and control communication network system, wherein an intelligent measurement and control communication network at least comprises: at least one management node and at least one common node, the intelligent measurement and control communication network being logically divided into a control plane and a service plane, all spacecrafts being divided into a first part of spacecrafts as the at least one management node, a second part of spacecrafts as the at least one common node and a third part of spacecrafts as at least one gateway node, at least one ground-based measurement and control station or at least one specific satellite being set as the at least one management node, part of the at least one common node forming the service plane, the service plane being divided into a plurality of task subnets according to tasks performed by the part of the at least one common node, each task subnet respectively completing tasks corresponding to this task subnet, and each task subnet performing autonomous network construction, autonomous cross-layer network resource management and intelligent routing with resource cognition; wherein the control plane and the service plane respectively employ different networking modes to perform duties of the control plane and the service plane, and different subnets of the service plane simultaneously respond to a plurality of different applications; the control plane combines, according to application and scenario needs of the tasks, an externally changed parameter to generate a new mathematical model in real time, adaptively changes a network behavior or algorithm, logic and encoding parameters, and selects a routing strategy with the shortest path, a new management node is selected from the service plane through machine learning, the selected management node is communicated with all common nodes to send control information comprising a ground instruction by measuring and controlling a formation spacecraft cluster target and an information interaction target through a satellite-to-ground link; the ground-based measurement and control station is communicated with the selected management node through the satellite-to-ground link, and indirectly implements measurement and control communication on all common nodes through the selected management node.

2. The intelligent measurement and control communication network system as claimed in claim 1, wherein the ground-based measurement and control station divides low-orbit and medium-orbit satellites into a cluster with an inter-satellite link, which is communicated with the inter-satellite link and a cluster without the inter-satellite link, and the cluster with the inter-satellite link and the cluster without the inter-satellite link complete measurement and control, communication and relative measurement tasks through a satellite-to-ground measurement and control data transmission link or a relay measurement and control link.

3. The intelligent measurement and control communication network system as claimed in claim 1, wherein the control plane comprises at least one management node and at least one common node, and a management node with strong processing capability is responsible for the management work of routing and task distribution of the whole intelligent measurement and control communication network; a spacecraft executing the tasks belongs to the at least one common node, a spacecraft directly communicated with the ground-based measurement and control station belongs to the at least one gateway node, and information transmission between the ground-based measurement and control station and each management node or each common node is transferred by the at least one gateway node.

4. The intelligent measurement and control communication network system as claimed in claim 1, wherein the selected management node receives first information from at least one of each common node and the ground-based measurement and control station, calculates second information based on the first information, and sends the second information to each common node; each common node starts to execute a task corresponding to the second information, and sends third information to the selected management node after completing the task or when an error occurs, or, each common node executes the current task all the time without receiving fourth information from the selected management node; when the external environment of the intelligent measurement and control communication network system changes or the intelligent measurement and control communication network system goes wrong in a calculation process, a new mathematical model is generated in real time through intelligent learning, to adaptively change a network behavior or parameters containing algorithm, logic and encoding.

5. The intelligent measurement and control communication network system as claimed in claim 1, wherein the at least one management node, a common node which does not execute a task and a common node which has completed a task are logically located in the control plane, and a common node which executes the task is logically located in the service plane.

6. The intelligent measurement and control communication network system as claimed in claim 1, wherein the common node on the control plane and the common node on the service plane have at least one of the following differences: different identifiers, different routing protocols and different topological relations with other common nodes.

7. The intelligent measurement and control communication network system as claimed in claim 1, wherein the service plane is divided into a first service plane task subnet for executing a high-precision orbit determination task and a second service plane task subnet for a cooperative reconnaissance task, common nodes on the same service plane task subnet have service plane identifiers of the same attribute, Internet Protocol (IP) addresses of the same network segment, and the same service plane routing protocol, and common nodes of different task subnets have service plane identifiers of different attributes, or IP addresses of different network segments, or different service plane routing protocols.

8. The intelligent measurement and control communication network system as claimed in claim 1, wherein each management node is communicated with common nodes distributed on the same control plane, each management node managing common nodes distributed on a control plane network to execute tasks, and common nodes executing the same task or related tasks are assigned into the same task subnet.

9. The intelligent measurement and control communication network system as claimed in claim 1, wherein the difference between the control plane and the service plane is that common nodes for executing tasks are assigned to the service plane, common nodes without executing the tasks or common nodes for competing the tasks are assigned to the control plane, and routing protocols, or IP address identifiers, or topological relations among the nodes of the common nodes assigned to the service plane are different from those of the common nodes assigned to the control plane.

10. The intelligent measurement and control communication network system as claimed in claim 1, wherein each common node transmits related information to a corresponding management node when each task executed by this common node changes, topological relations with other common nodes changes, and each device of this common node does not run correctly; the corresponding management node calculates and updates routing and tasks to be executed of each common node in real time according to received information, calculates the routing of all nodes in the whole network or manages tasks to be executed of each common node, and sends the tasks to be executed, the identifiers on the service plane, the topological relations and the routing protocols to each corresponding common node according to a calculation result.

* * * * *